United States Patent [19]
Jurjans

[11] Patent Number: 4,564,800
[45] Date of Patent: Jan. 14, 1986

[54] BATTERY CHARGER
[75] Inventor: Ojars Jurjans, Clementon, N.J.
[73] Assignee: Jetronic Industries, Inc., Philadelphia, Pa.
[21] Appl. No.: 616,236
[22] Filed: Jun. 1, 1984
[51] Int. Cl.$^4$ .............................................. H02J 7/04
[52] U.S. Cl. ....................................... 320/36; 320/15; 320/20; 320/21; 320/39; 363/17; 363/56
[58] Field of Search ..................... 320/15, 20, 21, 35, 320/36, 39, 56; 363/17, 56, 98

[56] References Cited
U.S. PATENT DOCUMENTS

| | | | |
|---|---|---|---|
| 3,696,283 | 10/1972 | Ackley, III | 320/15 |
| 4,330,816 | 5/1982 | Imazeki et al. | 363/56 |
| 4,370,606 | 1/1983 | Kakumoto et al. | 320/35 |

Primary Examiner—Peter S. Wong
Assistant Examiner—Anita M. Ault
Attorney, Agent, or Firm—Ratner & Prestia

[57] ABSTRACT

A switch-mode battery charger in which a pair of field effect transistors are operated at a relatively high switching rate. Protection against excessive overload is provided by directly monitoring the pulse trains produced by the transistors rather than the output charging current and reducing the duty cycle of the transistors when an excessive overload is detected. Protection against batteries which cannot take a charge is provided by monitoring the temperature in the vicinity of the transistors and first turning on a fan to cool the transistors and then disabling the transistors if the fan has failed to reduce the temperature an adequate amount.

7 Claims, 3 Drawing Figures

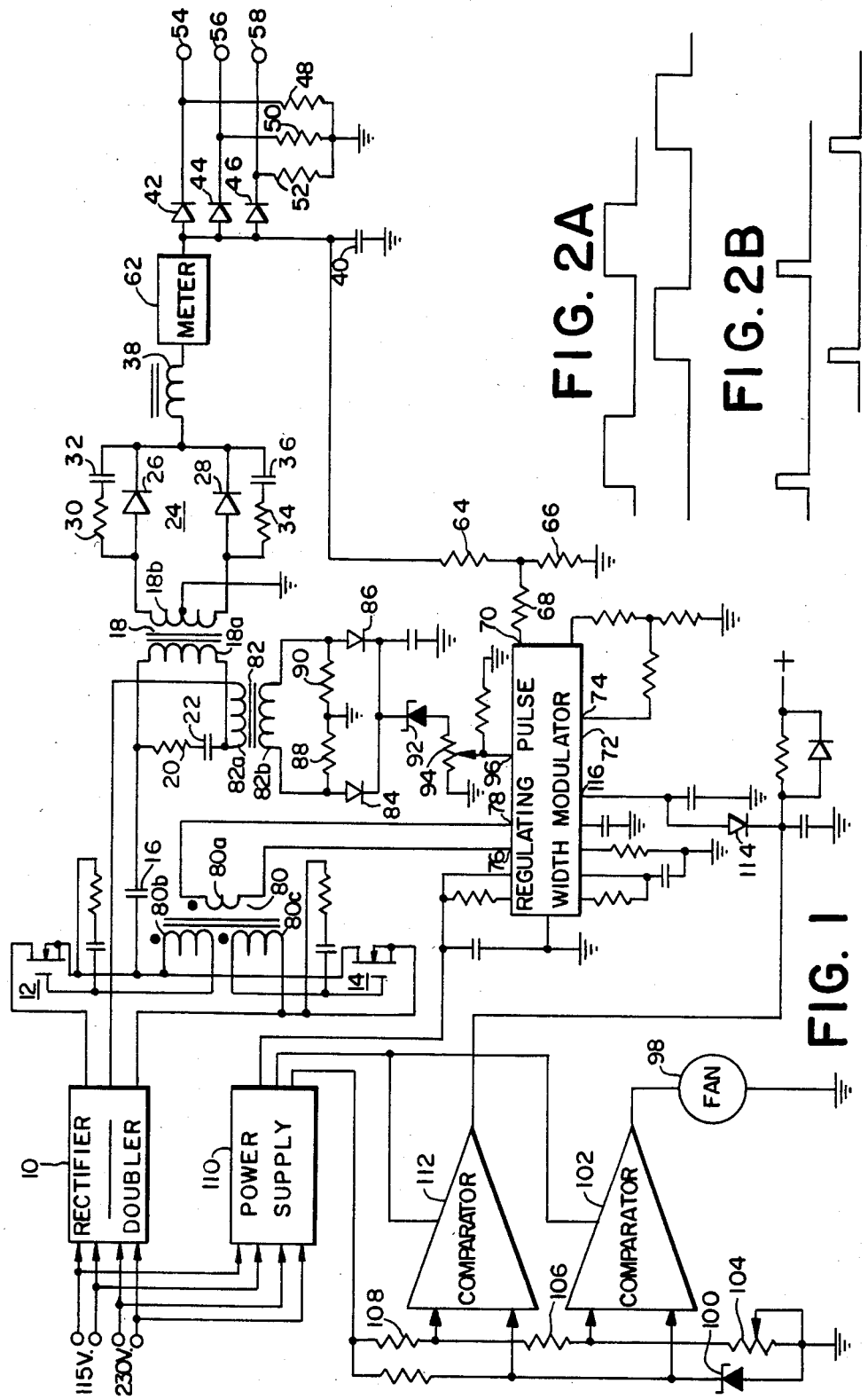

BATTERY CHARGER

DESCRIPTION

1. Technical Field

The present invention relates, in general, to battery charges and, in particular, to a switch-mode type battery charger particularly suited for marine applications.

2. Background Art

Many different types of battery chargers are commercially available at the present time. Generally, the electrical specifications, physical characteristics, and costs of these units are determined by their particular application. For example, an automobile battery charger carried on a tow truck should be portable. A battery charger used for over-night charging of a fork-lift truck battery needs to be arranged only to provide an over-night charge and nothing faster.

Certain chargers for marine batteries should be light-weight, provide a relatively quick charge, and priced relatively low to permit individual boat owners to have their own charger. Moreover, they should be arranged with protective circuits which prevent damage or destruction when a defective battery is connected to the charger. Applicant is not aware of any commercially available battery charger which satisfies concurrently these and still other practical requirements for charging marine batteries.

DISCLOSURE OF THE INVENTION

Accordingly, it is an object of the present invention to provide a new and improved battery charger.

It is another object of the present invention to provide a battery charger which can be packaged as a relatively small and light-weight unit and produced at a reasonable cost.

It is a further object of the present invention to provide a battery charger which can protect against defective batteries which have an absolute short and those which cannot take a charge.

It is yet another object of the present invention to provide a battery charger which has a high power conversion efficiency, whereby the power consumed by the battery charger and the internally generated heat are held to a minimum.

These and other objects are achieved, according to the present invention, by a battery charger having means for developing a d-c voltage from an a-c line voltage and switching means, including a pair of transistors connected in a half-bridge configuration, for chopping the d-c voltage. The switching means produce a pair of identical time displaced pulse trains having a variable duty cycle and a frequency substantially higher than the frequency of the a-c line voltage. A step-down transformer converts the pulse trains from high-voltage low-current pulse trains to low-voltage high-current pulse trains. A rectifier, responsive to the low-voltage high-current pulse trains, develops an output d-c voltage and a d-c charging current which is coupled to a battery which is to be charged. The desired output voltage is maintained by controlling the transistors to vary the duty cycle of the pulse trains according to differences between the actual output voltage and a reference signal representative of the desired output voltage.

Protection against a battery having an absolute short is provided by sampling the current flow through the primary winding of the transformer and controlling the transistors to reduce the duty cycle of the pulse trains to a predetermined minimum when current flow through the primary winding of the transformer rises in response to an overload which exceeds a predetermined level. Protection against a battery which cannot take a charge is provided by sensing the temperature in the vicinity of the transistors and turning on a fan to cool the transistors when a predetermined temperature level is exceeded. If the temperature in the vicinity of the transistors continues to rise despite the effect of the fan, the transistors are disabled.

BRIEF DESCRIPTION OF THE DRAWING

Referring to the drawing:

FIG. 1 shows a preferred embodiment of a battery charger constructed in accordance with the present invention; and FIGS. 2A and 2B are waveform diagrams useful in understanding the operation of the FIG. 1 battery charger.

BEST MODE OF CARRYING OUT THE INVENTION

The FIG. 1 embodiment of a battery charger, constructed in accordance with the present invention, includes a rectifier/doubler 10 which serves to develop a d-c voltage from an a-c line voltage. Rectifier/doubler 10 is arranged in a conventional manner to double a 115 volt a-c line voltage and to rectify a doubled 115 volt a-c line voltage or a 230 volt a-c line voltage to produce typically a 300 volt d-c voltage. It will be understood that references to particular voltages and currents are given only as typical examples and to facilitate explanation of the operation of the present invention.

The FIG. 1 battery charger also has switching means, including a pair of transistors 12 and 14 connected in a half-bridge configuration, for chopping the 300 volt d-c voltage to produce a pair of identical time displaced pulse trains having a variable duty cycle and a frequency substantially higher than the frequency of the particular a-c line voltage.

Transistors 12 and 14 are power field effect transistors which, in response to gating signals applied between their gates and sources, act as electronic switches to produce two pulse trains, such as the ones shown in FIG. 2A, from the 300 volt d-c voltage. Typically, transistors 12 and 14 can be switched on and off at a 150 KHz rate. The source of the gating signals and their application to transistors 12 and 14 will be considered, in greater detail, below.

The pulse trains developed by transistors 12 and 14 are coupled through a capacitor 16 to a step-down transformer 18 which converts the pulse trains from high-voltage low-current pulse trains to low-voltage high-current pulse trains. A resistor 20 and a capacitor 22 are connected across primary winding 18a of transformer 18 and serve as a snubber circuit to reduce the tendency to develop voltage spikes.

A rectifier 24 is connected across secondary winding 18b which as a ground center-tap. The rectifier develops an output d-c voltage and a d-c charging current from the low-voltage high-current pulse trains. Rectification of the low-voltage high-current pulse trains is accomplished by a pair of diodes 26 and 28, a resistor 30 and a capacitor 32 connected in series across diode 26, and a resistor 34 and a capacitor 36 connected in series across diode 28. An inductor 38 and a capacitor 40, arranged as an LC filter, filter the rectified signal. Typically, the output voltage is thirteen volts and the maximum charging current is thirty amperes.

The FIG. 1 battery charger also includes output means for coupling the d-c charging current to a battery which is to be charged. Such means may include a plurality of diodes 42, 44 and 46, a plurality of resistors 48, 50 and 52, and a plurality of output terminals 54, 56 and 58 to which a plurality of batteries may be connected individually. As illustrated, three batteries, isolated from one another, may be charged at the same time. A meter 62 may be included to provide a visual indication that charging current is flowing.

Variations in the a-c line voltage and the loads connected across output terminals 54, 56 and 58 tend to cause the output voltage to vary. The present invention utilizes a pulse width modulation technique to maintain the output voltage constant by automatically adjusting the duty cycle of the pulse trains applied to primary winding 18a of transformer 18. This provides maximum efficiency over the line voltage range and the output load range. As a battery is charging and its voltage increases, the delivered charging current is reduced automatically. When the battery is fully charged, its terminal voltage is equal to the output voltage of the battery charger and no more charging current will flow into the battery thus automatically stopping the flow of charging current.

Regulation of the output voltage of the battery charger is accomplished by control means which are responsive to the actual output voltage and to a reference signal representative of a predetermined output voltage and which control transistors 12 and 14 to vary the duty cycle of the pulse trains to reduce differences between the actual output voltage and the predetermined output voltage. Specifically, the output voltage of the charger is scaled down by a pair of resistors 64 and 66 and applied through a resistor 68 to the inverting terminal 70 of an error amplifier represented by regulating pulse width modulator 72. This voltage is compared to an internal reference voltage developed at a terminal 74 of the regulating pulse width modulator and the difference between the two is amplified by the error amplifier.

The output of regulating pulse width modulator 72 is at terminals 76 and 78 which are connected across the primary winding 80a of a transformer 80. A first secondary winding 80b of transformer 80 is connected between the gate and source of transistor 12 and a second secondary winding 80c is connected between the gate and source of transistor 14. Control pulses at the output terminals 76 and 78 of regulating pulse width modulator 72 are delivered through transformer 80 to transistors 12 and 14 to control the on-off times of the transistors and thereby vary the duty cycle of the pulse trains produced by the transistors to reduce differences between the actual output voltage and the desired output voltage.

Regulating pulse width modulator 72 may be a commercially available integrated circuit SG3525AN manufactured by Silicon General. Other manufacturers sell a similar unit. This integrated circuit is capable of performing other fuctions besides the one already described and the FIG. 1 battery charger makes use of this additional capability in the manner to be described below.

Before proceeding with a description of the remainder of the FIG. 1 battery charger, it will be useful to explain a main feature of the present invention. In this way, the significance of the remainder of the FIG. 1 battery charger will be understood better.

The switch-mode arrangement of transistors 12 and 14 permits developing high switching rates which, in turn, permits using smaller transformers and filtering components. This has a major effect in reducing the size, weight and cost of the battery charger. These factors are particularly important in marine battery chargers. Those on the market today, operating at a line frequency of 60 Hz, do not offer such desirable benefits.

On the other hand, switching transistors 12 and 14 must be protected against defective batteries. For example, a battery having an absolute short will draw excessive current from the battery charger and, in the absence of some form of protection, the switching transistors are likely to burn out.

Accordingly, a battery charger, constructed in accordance with the present invention, has a fast acting limiter which protects the output against absolute shorts and other types of overloads. This is accomplished by arranging the control means which controls the operation of switching transistors to respond to current flow through primary winding 18a of transformer 18 and when this current flow rises in response to an excessive overload the transistors are operated at a predetermined minimum duty cycle. A sample of the current flowing through primary winding 18a of transformer 18 is developed by means of a transformer 82 having its primary winding 82a connected in series with primary winding 18a. Secondary winding 82b of transformer 82 is connected to a full wave rectifier composed of a pair of diodes 84 and 86 and a pair of resistors 88 and 90. The threshold or reference for overload control is established by a zener diode 92 and a trim potentiometer 94 which is set for the maximum permissible output load charging current.

Any increase in the output charging current is reflected instantaneously in the current flowing through primary winding 18a of transformer 18 and primary winding 82a of transformer 82. When the threshold is reached, terminal 96 of regulating pulse width modulator 72 goes positive, taking over control from terminal 70, and the output from regulating pulse width modulator 72 at terminals 76 and 78 quickly reduces the duty cycle of switching transistors 12 and 14 so that the pulse width of the pulse trains produced by the transistors is reduced to a predetermined minimum. FIG. 2B illustrates the pulse trains with a greatly reduced duty cycle. Thus, regardless of the condition of the excessive load on the battery charger, the duty cycle of the switching transistors is limited to the predetermined minimum until the excessive load is removed and the sampling of the current flowing through the primary windings of transformers 18 and 82 drops below the threshold set by trim potentiometer 94. Typically, the output voltage of the battery charger drops to less than one volt when a battery having an absolute short is connected to an output terminal. In this way, switching transistor 12 and 14 and other electrical components are protected against excessive overloads.

Not all defective batteries have absolute shorts. Some simply cannot take a charge no matter how long they are connected to the battery charger. Thus, while not causing excessive charging currents, they continue to draw charging current for extended periods of time. This can cause transistors 12 and 14 to overheat. In order to protect against this condition, a battery charger, constructed in accordance with the present invention, is arranged with a two-step overheating protection.

The first step involves turning on a fan 98 to cool transistors 12 and 14 when the temperature in the vicinity of the transistors exceeds a first temperature. A temperature sensing element 100, in the form of a zener diode, is thermally coupled to the heat sink assembly of transistors 12 and 14. This element develops a signal representative of the temperature in the vicinity of the transistors and this signal is supplied to one input to a comparator 102 of conventional construction and operation.

A first temperature reference signal, representative of a first predetermined temperature, is supplied to the second input to comparator 102. This reference signal is established by the setting of a potentiometer 104 which is connected in series with a pair of resistors 106 and 108 to a source of d-c voltage represented by a power supply 110. A control signal for operating fan 98 is developed by comparator 102 when the temperature sensed by zener diode 100 exceeds the predetermined temperature represented by the setting of potentiometer 104. Fan 98 continues to operate until the temperature in the vicinity of transistors 12 and 14 drops below the predetermined temperature.

The second step in protecting against overheating of transistors 12 and 14 involves disabling the transistors. If the operation of fan 98 does not reduce the temperature in the vicinity of the transistors, the rising temperature is detected by a comparator 112. One input to this comparator is the temperature signal developed by zener diode 100. The second input is a second temperature reference signal representative of a second predetermined temperature which is greater than the first predetermined temperature. The second temperature reference signal is developed by the series connection of potentiometer 104 and resistor 106, with resistor 106 providing a fixed voltage drop which establishes a fixed relationship between the two predetermined temperatures.

When the temperature in the vicinity of transistors 12 and 14 exceeds the second predetermined temperature, comparator 112 develops a shut-off signal which is supplied to regulating pulse width modulator 72 via diode 114 and input terminal 116 to the regulating pulse width modulator. The shut-off signal takes priority over other control features of regulating pulse width modulator 72 and prevents the development of any output at terminals 76 and 78, thereby disabling transistors 12 and 14. The transistors remain disabled until the temperature in the vicinity of the transistors remains above the second predetermined temperature. After the temperature drops below the second predetermined temperature, the inhibiting effect of the shut-off signal from compacitor 112 is removed and the battery charger resumes normal operations.

Power supply 110 may be of conventional construction and operation in converting an a-c line voltage into a d-c voltage. The three outputs from power supply 110 indicate that the power supply powers comparators 102 and 112 and regulating pulse width modulator 72 and provides the d-c voltage from which the two predetermined temperature reference signals are developed.

Various other components, notably capacitors and resistors, are shown in FIG. 1 but do not require specific explanation. Those skilled in the art well recognize the nature and purpose of these components.

While in the foregoing there has been described a preferred embodiment of the present invention, it should be understood to those skilled in the art that various modifications and changes can be made without departing from the true spirit and scope of the invention as recited in the claims.

What is claimed:

1. A battery charger comprising:
  means for developing a d-c voltage from an a-c line voltage;
  switching means, including a first transformer and a pair of field effect transistors connected in a half-bridge configuration, for chopping said d-c voltage to produce a pair of identical time displaced pulse trains having a variable duty cycle and a frequency substantially higher than the frequency of said a-c line voltage, a first secondary winding of said first transformer connected between the gate and source of one of said field effect transistors and a second secondary winding of said first transformer connected between the gate and source of the other of said field effect transistors;
  a step-down transformer for converting said pulse trains from high-voltage low-current pulse trains to low-voltage high-current pulse trains;
  rectifying means responsive to said lowvoltage high-current pulse trains for developing an output d-c voltage and a d-c charging current;
  output means for coupling said d-c charging current to a battery which is to be charged;
  means for supplying an output voltage reference signal representative of a predetermined output voltage;
  means for supplying an overload voltage reference signal representative of an excessive overload caused by a battery which is to be charged;
  and control means connected to a primary winding of said first transformer and (1) responsive to said output voltage and said output voltage reference signal for controlling said transistors to vary said duty cycle of said pulse trains to reduce differences between said output voltage and said predetermined output voltage, and (2) responsive to a sampling signal representative of current flow through a primary winding of said step-down transformer and said overload reference signal for controlling said transistors to reduce said duty cycle of said pulse trains to a predetermined minimum when said current flow through said primary winding of said step-down transformer rises in response to an overload which exceeds said excessive overload represented by said overload reference signal, said control means including a third transformer having a primary winding connected in series with said primary winding of said step-down transformer and a secondary winding for developing said sampling signal representative of current flow through said primary winding of said step-down transformer.

2. A battery charger according to claim 1 wherein said output means include a plurality of output terminals to which a plurality of batteries which are to be charged are connected and a plurality of diodes, one associated with each output terminal, for isolating said output terminals.

3. A battery charger according to claim 2 wherein said means for developing said d-c voltage include:
  (a) a voltage doubler responsive to a 115 volt line voltage for doubling said 115 volt line voltage; and (b) a rectifier responsive to a doubled 115 volt line voltage or a 230 volt line voltage for developing said d-c voltage.

4. A battery charger according to claim 2 further including:
   (a) means for sensing the temperature in the vicinity of said transistors and for developing a temperature signal representative of said temperature;
   (b) means for supplying a first temperature reference signal representative of a first predetermined temperature;
   (c) means responsive to said temperature signal and said first temperature reference signal for developing a fan control signal when said temperature in said vicinity of said transistors exceeds said first predetermined temperature; and
   (d) a fan located in said vicinity of said transistors and responsive to said fan control signal for cooling said transistors.

5. A battery charger according to claim 4 further including:
   (a) means for supplying a second temperature reference signal representative of a second predetermined temperature greater than said first predetermined temperature;
   (b) means responsive to said temperature signal and said second temperature reference signal for developing a shut-off signal when said temperature in said vicinity of said transistors exceeds said second predetermined temperature; and
   (c) means responsive to said shut-off signal for disabling said transistors.

6. A battery charger according to claim 5 wherein said output means include a plurality of output terminals to which a plurality of batteries which are to be charged are connected and a plurality of diodes, one associated with each output terminal, for isolating said output terminals.

7. A battery charger according to claim 6 wherein said means for developing said d-c voltage include:
   (a) a voltage doubler responsive to a 115 volt line voltage for doubling said 115 volt line voltage; and
   (b) a rectifier responsive to a doubled 115 volt line voltage or a 230 volt line voltage for developing said d-c voltage.

* * * * *